(12) United States Patent
Baderspach et al.

US007543778B2

(10) Patent No.: US 7,543,778 B2
(45) Date of Patent: Jun. 9, 2009

(54) DOOR FOR AIRCRAFT, AND AIRCRAFT PROVIDED WITH SUCH A DOOR

(75) Inventors: Jérôme Baderspach, Labarthe sur Leze (FR); Sébastien Rondot, Saint Nazaire (FR)

(73) Assignee: Airbus France, Toulouse (FR)

( * ) Notice: Subject to any disclaimer, the term of this patent is extended or adjusted under 35 U.S.C. 154(b) by 478 days.

(21) Appl. No.: 11/170,037

(22) Filed: Jun. 29, 2005

(65) Prior Publication Data
US 2006/0186270 A1    Aug. 24, 2006

(30) Foreign Application Priority Data
Jul. 9, 2004    (FR)    .................................. 04 51485

(51) Int. Cl.
*B64C 1/14*    (2006.01)
*E05D 15/28*    (2006.01)
(52) U.S. Cl. .................... 244/129.5; 244/129.3; 49/246
(58) Field of Classification Search ............. 244/129.3, 244/129.4, 129.5; 49/246, 253; 114/116, 114/117, 173, 177, 178, 201 R
See application file for complete search history.

(56) References Cited

U.S. PATENT DOCUMENTS

| | | | | |
|---|---|---|---|---|
| 1,854 | A * | 11/1840 | Smith .............................. 16/80 |
| 1,449,720 | A * | 3/1923 | Hyslop ......................... 114/178 |
| 2,219,461 | A * | 10/1940 | Williams ..................... 114/177 |
| 2,425,846 | A * | 8/1947 | Trewen ........................ 114/178 |
| 2,479,713 | A * | 8/1949 | Beach .......................... 244/121 |
| 2,584,500 | A * | 2/1952 | Riordan ........................ 49/246 |
| 2,942,811 | A | 6/1960 | Bell |
| 3,183,873 | A * | 5/1965 | Wallace ................... 114/201 R |
| 3,303,961 | A * | 2/1967 | Witherspoon et al. ....... 220/293 |
| 3,312,017 | A * | 4/1967 | Witherspoon et al. ......... 49/246 |
| 3,421,721 | A * | 1/1969 | Miller ....................... 244/129.5 |
| 3,465,991 | A * | 9/1969 | Banas et al. .............. 244/137.2 |
| 3,596,403 | A * | 8/1971 | Carr .............................. 49/246 |
| 3,618,881 | A * | 11/1971 | Fellers et al. ................ 244/121 |
| 3,730,128 | A * | 5/1973 | Burwell ................... 114/201 R |
| 3,779,198 | A * | 12/1973 | Gray ........................... 114/178 |
| 3,791,073 | A * | 2/1974 | Baker .......................... 49/249 |

(Continued)

FOREIGN PATENT DOCUMENTS

CH         664444  A5      2/1988

(Continued)

OTHER PUBLICATIONS

"NASA—The Orbiter" Wilson, Jim, Mar. 4, 2005, NASA http://web.archive.org/web/20050404202848/http://www.nasa.gov/returntoflight/system/system_Orbiter.html.*

*Primary Examiner*—Michael R Mansen
*Assistant Examiner*—Joseph W Sanderson
(74) *Attorney, Agent, or Firm*—Patterson, Thuente, Skaar & Christensen, P.A.

(57) ABSTRACT

A door for aircraft is capable of blocking an aperture made in the aircraft. A framing of the door is connected to the fuselage by hinging means. The framing is mounted rotationally on the hinging means. The door is capable of taking two opposite stable positions, by 180° rotation about hinging means. The door comprises means to lock the framing in either of the stable positions. A first face of the framing is fitted with an observation dome, a second face comprising an access hole to the dome.

11 Claims, 2 Drawing Sheets

U.S. PATENT DOCUMENTS

| | | | |
|---|---|---|---|
| 4,086,726 A * | 5/1978 | Moses | 49/37 |
| 4,220,298 A * | 9/1980 | Willis | 244/129.5 |
| 4,239,008 A * | 12/1980 | Conlon | 105/377.08 |
| 4,300,440 A * | 11/1981 | Holter | 454/78 |
| 4,415,197 A * | 11/1983 | Meyer | 296/216.02 |
| 4,474,348 A * | 10/1984 | Skotte | 244/129.5 |
| 4,479,623 A * | 10/1984 | Maraghe et al. | 244/129.5 |
| 4,552,326 A * | 11/1985 | Bokalot | 244/129.5 |
| 4,589,613 A * | 5/1986 | Opsahl | 244/129.5 |
| 4,842,223 A * | 6/1989 | Allton et al. | 244/158.1 |
| 5,180,121 A * | 1/1993 | Banks et al. | 244/129.5 |
| 5,205,516 A * | 4/1993 | Bright et al. | 244/121 |
| 5,231,948 A * | 8/1993 | Malmanger et al. | 114/201 R |
| 5,301,626 A * | 4/1994 | Penny | 114/202 |
| 5,335,880 A * | 8/1994 | Klug | 244/118.3 |
| 5,520,358 A * | 5/1996 | Kahn et al. | 244/129.5 |
| 5,678,787 A * | 10/1997 | Kahn et al. | 244/129.5 |
| 5,803,405 A * | 9/1998 | Ellis et al. | 244/130 |
| 5,826,824 A * | 10/1998 | Martin et al. | 244/129.3 |
| 5,931,415 A * | 8/1999 | Lingard et al. | 244/129.5 |
| 5,946,856 A * | 9/1999 | Davlantes | 49/168 |
| 5,947,417 A * | 9/1999 | Cameron | 244/129.5 |
| 5,975,463 A * | 11/1999 | Gruensfelder et al. | 244/118.1 |
| 6,068,215 A * | 5/2000 | Gruensfelder et al. | 244/129.5 |
| 6,116,542 A * | 9/2000 | Erben | 244/129.5 |
| 6,126,114 A * | 10/2000 | Victor | 244/129.5 |
| 6,168,114 B1 * | 1/2001 | Erben | 244/129.5 |
| 6,341,748 B1 * | 1/2002 | Brooks et al. | 244/129.5 |
| 6,658,803 B2 * | 12/2003 | Szyjkowski | 52/213 |
| 6,684,569 B2 * | 2/2004 | Gineris et al. | 49/379 |
| 6,796,528 B2 * | 9/2004 | Wood et al. | 244/121 |
| 6,796,529 B1 * | 9/2004 | Duran et al. | 244/129.5 |
| 6,834,834 B2 * | 12/2004 | Dazet et al. | 244/129.5 |
| 6,883,755 B2 * | 4/2005 | Pautis et al. | 244/129.3 |
| 2005/0116106 A1 * | 6/2005 | Perez-Sanchez | 244/129.4 |

FOREIGN PATENT DOCUMENTS

| | | |
|---|---|---|
| DE | 3346976 A1 | 7/1985 |
| DE | 19732514 C1 | 10/1998 |
| EP | 0876954 A2 | 11/1998 |
| GB | 534761 A | 3/1941 |
| GB | 1213503 A | 11/1970 |

* cited by examiner

DOOR FOR AIRCRAFT, AND AIRCRAFT PROVIDED WITH SUCH A DOOR

RELATED APPLICATION

The present application claims priority to French Application No. 04 51485 filed Jul. 9, 2004.

BACKGROUND OF THE INVENTION

1. Field of the Invention

The invention belongs to the field of aeronautics. The invention can be applied more particularly in the field of military aircraft. The invention can also be applied in the field of civilian aircraft. An object of the invention is a door capable of blocking an opening or aperture made in a fuselage of an aircraft. More specifically, an object of the invention is a door that can have at least two different stable configurations in a closed position. An object of the invention is also an aircraft having at least one such door.

It is an aim of the invention to provide a door which enables, for example, passengers and/or crew to be evacuated when the door is open, and which, as needed, can provide, for example, an observation station that projects out on the fuselage or on the contrary, a smooth surface with no aerodynamic drag. It is an additional aim of the invention to facilitate interchangeability between possible functions of the door in addition to the blocking function.

2. Description of the Prior Art

An aircraft is generally formed by a fuselage and a wing structure fixedly joined to the fuselage. The fuselage, or body of the aircraft, comprises at least one door, or hatch, enabling communication between the exterior and the interior of the fuselage.

A known example of a door is a door provided with a frame fixedly joined to the fuselage and a flap capable of being hinged on the frame. In an open position, the flap is at a distance from the frame and thus releases an access to the fuselage. In a closed position, the flap is applied to the frame so as to block access to the fuselage. The flap has a smooth external surface, optimizing the aerodynamic profile of the fuselage and preventing aerodynamic drag. The term "external surface of the flap" is understood to mean the face of the flap that is directed to the exterior of the aircraft.

Generally, a door of this kind serves as a usual communications door, namely a door used for the boarding of passengers and/or crew, or as an emergency door used in the case of emergency evacuation. The door may be provided with a port. The port gives a passenger limited observation of what is happening outside the aircraft. Indeed, the field of observation through the port does not cover a view of what is happening at the sides or towards the top and/or the bottom of the aircraft.

There are known ways, especially in the field of military aircraft, for providing the fuselage with an observation station by which the surroundings of the aircraft can be seen over 360°, as well as upwards. For example, an external wall of the fuselage is provided with a dome made out of a transparent material. The dome is located, for example, on another front part of the fuselage, and covers an aperture in the wall of the fuselage. A person, from inside the fuselage, may penetrate an inner wall of the dome and observe the exterior. The term "internal volume of the dome" is understood to mean the volume made between the wall of the dome and the wall of the fuselage, the dome forming a projection on said wall. Such a dome is mounted so as to be fixed to the fuselage. Since the dome forms a projection on the fuselage, it increases the surface area of the aircraft on with the tearing forces can be exerted when the aircraft is in flight. An aerodynamic drag is created at the position of the aerodynamic dome, diminishing the kinetic performance of the aircraft as well as the stability of said aircraft.

This observation dome may furthermore be disadvantageous in a military aircraft under enemy fire. Since the dome forms a projection on the fuselage, it is a visible and easy target for enemy fire. Furthermore, the material used is generally light so as not to excessively increase the total weight of the aircraft. This material is often flimsier than the materials used to manufacture the aircraft itself, i.e. the fuselage, the wing structure, the faring, etc. An impact, for example a bullet impact, in the dome may irreparably damage the aircraft, by allowing depressurization of the interior of said aircraft through a hole formed by the bullet in the dome.

Furthermore, the dome cannot be placed anywhere on the fuselage. Indeed, its space requirement has to be taken into account. In particular, it must be positioned at a sufficient distance from the aircraft doors. The term "sufficient distance" is understood to mean a distance enabling door travel in such a way that the door can be opened and closed without being hampered by the dome.

Furthermore, at present, the external wall of the fuselage of military aircraft is increasingly being fitted with specific devices, such as cameras, weapons, GPS devices or the like which can be controlled from inside the fuselage. The devices increase the general amount of space taken up on the wall of the fuselage. The distribution of the devices then depends on the remaining unoccupied surface on the external wall of the fuselage, and especially on the number of doors and their locations.

In the invention, it is sought to resolve the above-stated problems by proposing a door that is capable, firstly, of blocking a passage between the inside and the outside of the aircraft and, secondly, owing to its particular structure, of fulfilling one or more other functions.

To this end, the door of the invention is mounted rotationally about two independent axes of rotation. A first axis of rotation is situated at the position of a link between hinges of the door and the fuselage. The hinges are fixedly joined to the fuselage and the door, and thus join the door to the fuselage. The first axis of rotation permits door travel so that said door can pass from an open position to a closed position, or vice versa, as needed. A second axis of rotation is located at the position of a link between the hinges of the door and the door itself. Thus, the door may rotate about hinges so that different faces can be applied in turn against the wall of the fuselage.

The door may have means to lock the rotation of the door about the hinges. Thus, the rotation of the door about the second axis is not allowed when said door is in the desired configuration.

Each face of the door may be provided with a particular set of equipment such as an observation dome, a camera, a smooth plate, etc. According to need, a user exposes one face rather than another to the exterior of the aircraft.

SUMMARY OF THE INVENTION

An object of the invention therefore is a door for aircraft, capable of blocking an aperture made in a fuselage of the aircraft, the door comprising a framing connected to the fuselage by hinging means, wherein the framing is mounted rotationally on the hinging means.

In particular embodiments of the invention, the door may also comprise additional characteristics among the following characteristics:

the door is capable of taking two opposite stable positions, by 180° rotation about hinging means;

the door comprises means to lock the framing, in either of the stable positions;

a first face of the framing is fitted with an observation dome, a second face comprising an access hole to the dome;

the door comprises means to block the recess hole on the second face;

the blocking means comprise at least one slideway made in the framing at the second face of said framing and a plate capable of sliding in the slideway;

the dome is detachable the door blocks an aperture made at the position of a cockpit of the aircraft;

the hinging means comprise external swivels;

the hinging means comprise internal swivels.

The invention also relates to an aircraft comprising at least one door as described here above.

BRIEF DESCRIPTION OF THE DRAWINGS

The invention shall be understood more clearly from the following description and the accompanying figures. These figures are given by way of an indication and in no way restrict the scope of the invention. Of these figures.

MORE DETAILED DESCRIPTION

Figure 1:
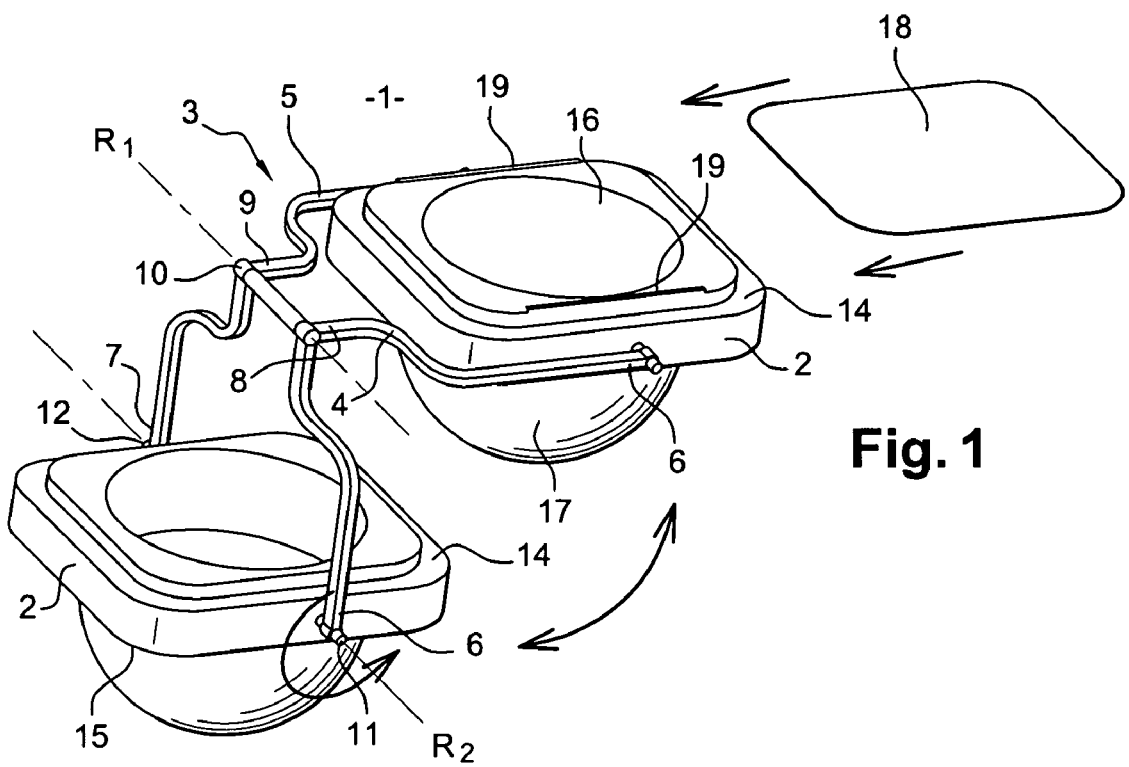
FIG. 1 shows a door according to one embodiment of the invention.

FIG. 1 shows an exemplary door 1 of the invention. The door 1 may have several different configurations owing to its hinging around two axes of rotation that are different and independent of each other, respectively R1 and R2.

FIG. 1 therefore shows the door 1 in two different positions. More specifically, FIG. 1 shows the door 1 in two possible positions relative to the axis of rotation R1 and two possible positions relative to the axis of rotation R2. However, it must be noted that it may happen that the rotation about the axis of rotation R2 is permitted only when the door 1 is in an appropriate configuration relative to the axis of rotation R1.

The door 1 comprises a framing 2 designed to be attached to a wall of a fuselage of an aircraft (not shown), at the position of an aperture made on said wall. The framing 2 is connected to the fuselage by means of hinging means 3.

In the example shown in FIG. 1, the hinging means 3 comprise two hinging arms 4 and 5. The hinging arm 4 is provided with a first end 6, joined to the framing 2, and a second end 8, joined to a swivel 10. The swivel 10 is fixed to the wall of the fuselage. Similarly, the hinging arm 5 is provided with a first end 7, joined to the framing 2, and a second end 9, joined to a swivel 10. The second end 8 of the hinging arm 4 and the second end 9 of the hinging arm 5 are mounted rotationally on the swivel 10. Thus, the door 1 may be tilted about the axis of rotation R1 passing through the swivel 10.

In another embodiment of the invention, it can be planned that the hinging means 3 will comprise two hinging arms 4 and 5, each hinging arm 4 and 5 being connected by its second end, respectively 8 and 9, to a swivel that is fixedly joined to the wall of the fuselage. The axis of rotation R1 then passes through the two swivels. It is also possible to provide for a single hinging arm and a single swivel.

The axis of rotation R1 enables the door 1 to pass from an open position to a closed position, and vice versa. The open position corresponds to a position of the door 1 distant from the wall of the fuselage. Thus, it is possible to pass from the interior of the aircraft of the exterior, through the opening made in the wall of the fuselage. The closed position of the door 1 corresponds to a position in which the door 1 blocks the aperture made in the fuselage. The framing 2 is then applied against the wall of the fuselage.

When the door 1 is fixed by means of the swivel 10 to the wall of the fuselage, it may, for example, have 180° travel corresponding to a 180° rotation of the door 1 about the rotation axis R1, enabling the opening and/or the closing of the door 1. Naturally, it is possible to permit smaller travel, for example a 90° travel so that the door 1, in the open position, moves away from the wall of the fuselage by only 90°.

Each first end 6 or 7 of each hinging arm 4 or 5 is mounted rotationally on the framing 2 of the door 1. Thus, for example, the first end 6 of the hinging arm 4 is connected to the framing 2 by a first pivot 11, while the first end 7 of the hinging arm 5 is connected to the framing 2 by a second pivot 12. The pivots 11 and 12 are diametrically opposite to each other on the framing 2. However, the pivots 11 and 12 may be positioned differently, inasmuch as their positions permit a rotation of the door 1. The second rotation axis R2 passes through the first pivot 11 and the second pivot 12. The framing 2 of the door 1 may rotate freely about the axis of rotation R2. It is possible to permit a 360° rotation about the axis of rotation R2. In the invention, it is planned to have at least two stable positions of the framing 2 about the rotation axis R2.

As needed, the framing 2 is made to rotate about the rotation axis R2, so that said framing 2 has, for example, a first face 14 or a second face 15 pointing to the external or internal wall of the fuselage. Thus, in the example shown, it is possible to block the aperture made in the wall of the fuselage by the first face 14 of the framing 2 or by the second face of said framing 2.

If the framing 2 is provided with two faces 14 and 15 capable of being used to block the aperture made in the wall of the fuselage, the door 1 can be provided with means to lock the framing 2 in either of these two configurations, in order to make them stable. For example, it is possible to provide for clamps 20 (FIG. 2) about the end 6 and 7 of the hinging arms 4 and 5 at the position of their link with the pivots 11 and 12. When it is desired to modify the configuration of the framing 2, the clamps 20 are withdrawn, so as to make the end 6 and 7 free to rotate about the pivots 11 and 12. The framing 2 is made to rotate about the rotation axis R2. Once the desired position of the framing 2 has been obtained, the clamps 20 are tightened about the ends 6 and 7, at the position of the pivots 11 and 12, so as to thereafter prevent any rotational motion.

In other exemplary embodiments of the invention, different means for locking the framing 2 can be used. For example, it can be planned to provide the door 1 with keys capable of being inserted into holes made in the hinging arms 4 and 5 at the position of the link between the hinging arms 4 and 5 and the pivots 11 and 12.

In order to make the framing 2 rotate about the rotation axis R2, it may be necessary to first make the door 1 pivot about the rotation axis R1, in order to move the door 1 away from the wall of the fuselage, and thus prevent the wall from hampering the rotation of the framing 2 about the axis R2.

In one particular exemplary embodiment of the invention, it is planned to allow a 180° rotation of the framing 2 about the rotation axis R2, so that the framing 2 can apply the first face 14 or the second face 15 against the wall of the fuselage. It is also possible to allow a 360° rotation about the rotation axis R2. Freedom of rotation of this kind may be useful when the framing 2 is provided, for example, with four faces capable of obstructing the aperture made in the wall of the fuselage. Indeed, in this case, where the framing 2 has a general cross shape, the 360° enables the four faces of the cross to be applied, each in turn, against the wall of the fuselage.

As will be seen here below, each face 14, 15 of the framing 2 may be provided with a different blocking device.

In the example shown in FIG. 1, the framing 2 is provided with a central recess 16 capable of receiving a blocking device. Each face 14 or 15 of the framing 2 can receive blocking devices simultaneously or successively.

Thus, in FIG. 1, the second face 15 of the framing 2 is provided with an observation device 17 formed, for example, by a dome made of a transparent material. The dome 17 may be detachable. For example, the dome 17 is provided with a screw thread on an external surface, the screw thread being capable of co-operating with a screw thread made on an internal wall of the framing 2 bordering the recess 16. The dome 17 can thus be removed by unscrewing and replaced by another blocking device. It is also possible to fixedly join the dome 17 to the face 15 of the framing 2 by soldering or any other irreversible fastening means.

Figure 2:
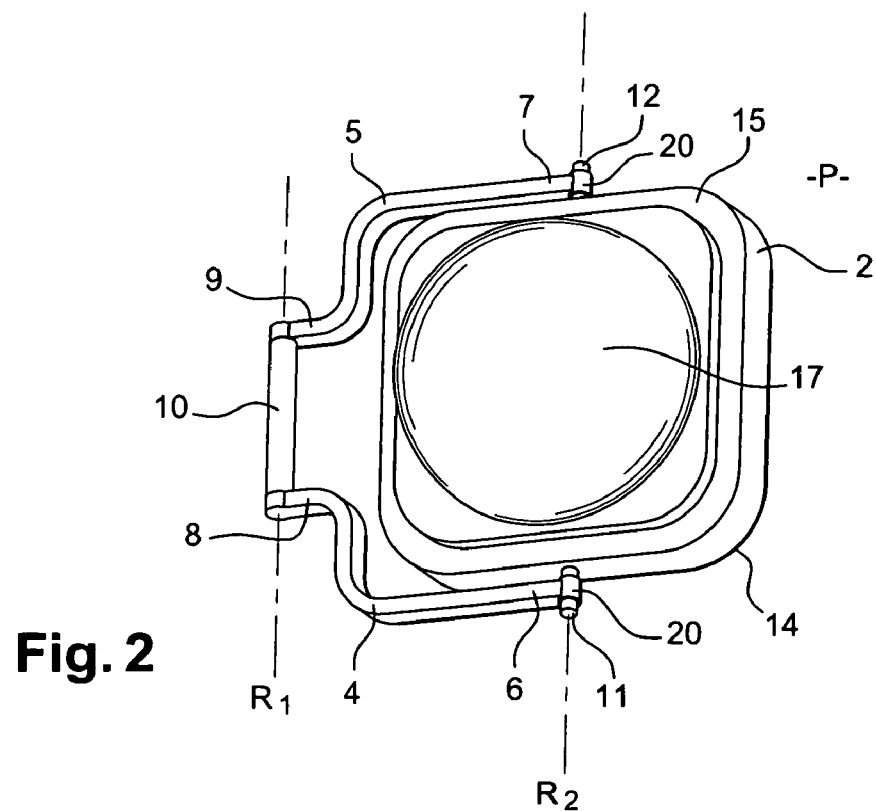
FIG. 2 shows the door of FIG. 1 in a stable position.
Figure 3:
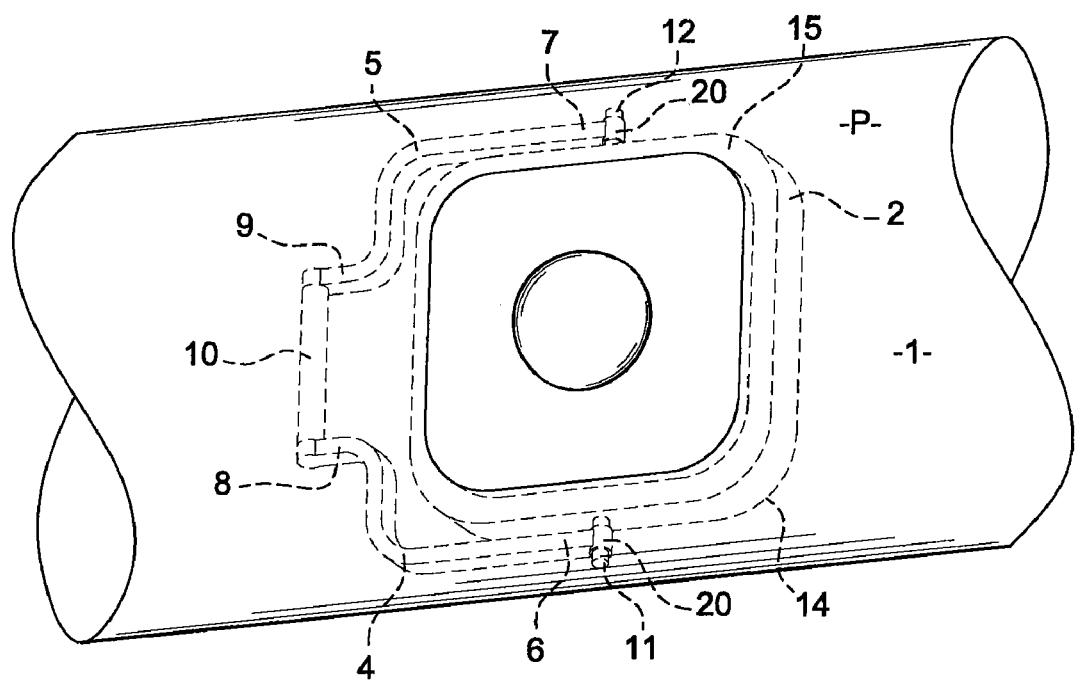
FIG. 3 depicts an aircraft fuselage with the door according to FIG. 1.

The dome 17, when located outside the fuselage, may provide an observation post to observe what is happening outside the aircraft from inside said aircraft. In FIG. 2, the first face 14 of the framing 2 rests on the external wall P of the fuselage.

The dome 17 is located outside the fuselage. Naturally, for observation through the dome 17 to be possible, the first face 14 is without the device used to block the recess 16. In another example of an embodiment, it may be provided that the swivel 10 will be an internal swivel, namely one fixedly joined to an internal wall of the fuselage. For the dome 17 to emerge from the fuselage, it is the face 15 of the framing 2 that must be applied to the inner wall of the fuselage bordering the aperture.

The dome 17 has, for example, a diameter of 60 cm. The dome 17 therefore goes beyond a plane surface, represented by the outer wall P of the fuselage, by a maximum of 30 cm. It is possible to provide for a bigger or smaller dome 17 depending on the uses to be made of the dome 17. Indeed, the shape of the dome 17 can be adapted depending on whether this dome is planned for a military aircraft or a civilian aircraft, and depending on whether it is planned that it should enable only one person or a group of persons to observe the surroundings.

The first face 14 can be provided with a blocking device 18, such as for example a sheet-metal plate capable of blocking the central recess 16. For example, the face 14 of the framing 2 is provided with slideways 19 in which the plate 18 can slideway. When the plate 18 is fixed to the face 14 of the framing 2, said face 14 has a smooth appearance.

A user may wish to make the dome 17 re-enter the interior of the fuselage. He may then pivot the framing 2 by 180° about the rotation axis R2, so that the face 14 of the framing 2 is pointed to the exterior of the aircraft. Since the face 14 is provided with the plate 18, the surface of the outer wall P of the fuselage is perfectly smooth at the position of the door 1. The dome 17 can be brought back inside the fuselage; it is absolutely non-detectable from outside said aircraft.

It is then no longer possible to observe what is happening outside the aircraft. In another example, and in order to be able to continue observation from outside the aircraft through the recess 16, the face 14 of the framing 2 can be provided with a plate 18 made of a transparent material, such as glass or Plexiglas.

Naturally, the transition between the configuration of the door 1 for which the dome 17 is outside the aircraft, and configuration for which said dome 17 is inside the aircraft is done on the ground.

In another exemplary embodiment of the invention, the faces 14 and 15 of the framing 2 can be provided with different blocking devices such as, for example, a camera, a GPS system etc. In general, whatever the devices that the door 1 is provided with, the problem of the space required on the wall of the fuselage is resolved since the door and the devices are superimposed.

Furthermore, all the blocking devices may be mounted on the framing 2 detachably, by sliding in the slideways, or by screwing, or the like. The framing 2 of the invention therefore has great interchangeability and can adapt to any type of aircraft and any requirement.

In one particular exemplary embodiment of the invention, the door 1 of the invention is mounted at the position of a cockpit of the aircraft. The cockpit is a front part of the aircraft at whose position at least one pilot may be situated. The cockpit is generally an uncovered part of the aircraft, namely a part provided with a transparent Plexiglas wall enabling the pilot to see out of the aircraft. The door 1 provides an emergency exit for the pilot as well as a substitute or additional means of observation when the door 1 is provided with the dome 17. The aircraft can also be provided with one or more doors 1 at different positions of the fuselage. For example, a bottom part of the fuselage can be provided with a door 1 of this kind. The term "bottom part" is understood to mean the part pointed to the ground. Thus, if the framing 2 is provided with an observation dome 17, it is possible to observe what is happening on the ground when the aircraft is in the air.

Depending on need, the door 1 may have a kinematically designed variable-opening system. For example, it can be planned that the opening of the door 1, obtained by putting the door 1 into rotation about the axis of rotation R1, is done from outside the fuselage. In this case, the swivel 10 is mounted on the external wall of the fuselage, as shown in FIG. 2. In another exemplary embodiment of the invention, provision can be made for an internal opening of the door 1. That is, the play of the door 1 about the rotation axis R1 will be done inside the fuselage. The swivel 10 is then fixedly joined to an internal wall of the fuselage. It is also possible to provide for swan necks or equivalent means positioned so as to enable free external access and efficient conditions of emergency evacuation. It is also possible to provide for an internal swivel enabling the door 1 to be made to pivot in order to return with the purpose of being able to block the observation device from the interior by means of a closing plate or another piece of equipment, the assembly being capable of withdrawing from the aperture in order to enable evacuation.

It is possible to plan for the door 1 to be provided with an ejection device enabling the door to be made ejectable when extreme conditions require it.

The door 1 may be a plug type door. Pressure loads are then absorbed by the hinging means 10 of the door 1 on the fuselage of the aircraft. Locking means are planned, positioned for example opposite the hinging means 10, in order to lock the framing 2 on the fuselage. The locking means may be secured, for example, by struts. It is also possible to provide for tight-sealing means inside the fuselage, such as seals positioned between the framing 2 and the wall of the fuselage.

What is claimed is:

1. A door for an aircraft, the door adapted to block structure defining an aperture formed in a wall of a fuselage of the aircraft, the door comprising a framing operably coupled to the fuselage by a hinging assembly, the framing presenting a first face, and a second opposing face, wherein the framing is mounted rotationally on the hinging assembly such that the door is rotationally shiftable between a first stable closed position in which the first face is applied against a first side of the wall such that the door substantially fills the aperture, and a second stable closed position in which the second face is applied against the first side of the wall such that the door substantially fills the aperture.

2. The door according to claim 1, the door being shiftable between the two stable closed positions, by 180° rotation about the hinging assembly.

3. The door according to claim 2, comprising means for locking the framing in either of the stable positions.

4. The door according to claim 1, wherein a first face of the framing is fitted with an observation dome, and a second face comprises structure defining an access hole to the dome.

5. The door according to claim 4, comprising means for blocking the access hole on the second face.

6. The door according to claim 5, wherein the blocking means comprise at least one slideway made in the framing at the second face of said framing and a plate being slidable in the slideway.

7. The door according to claim 4, wherein the dome is detachable.

8. The door according to claim 1, wherein said door blocks an aperture formed at the position of a cockpit of the aircraft.

9. The door according to claim 1, wherein the hinging assembly comprises external swivels.

10. The door according to claim 1, wherein the hinging assembly comprises internal swivels.

11. An aircraft comprising at least one door according to claim 1.

* * * * *